US009763262B2

(12) United States Patent
Zhu et al.

(10) Patent No.: US 9,763,262 B2
(45) Date of Patent: Sep. 12, 2017

(54) WIRELESS COMMUNICATIONS DEFERRAL BASED ON TRANSMISSION OPPORTUNITY

(71) Applicant: QUALCOMM Incorporated, San Diego, CA (US)

(72) Inventors: Hao Zhu, Ocala, FL (US); Simone Merlin, Solana Beach, CA (US); Chao Zou, San Jose, CA (US); Srinivas Katar, Fremont, CA (US); Hemanth Sampath, San Diego, CA (US); Gwendolyn Denise Barriac, Encinitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 111 days.

(21) Appl. No.: 14/527,533

(22) Filed: Oct. 29, 2014

(65) Prior Publication Data

US 2015/0124744 A1    May 7, 2015

Related U.S. Application Data

(60) Provisional application No. 61/898,951, filed on Nov. 1, 2013.

(51) Int. Cl.
*H04W 4/00*     (2009.01)
*H04W 72/12*    (2009.01)
*H04W 74/08*    (2009.01)
*H04W 84/12*    (2009.01)

(52) U.S. Cl.
CPC ... *H04W 72/1257* (2013.01); *H04W 74/0816* (2013.01); *H04W 84/12* (2013.01)

(58) Field of Classification Search
CPC ................................................ H04W 74/0816
See application file for complete search history.

(56) References Cited

U.S. PATENT DOCUMENTS

| 8,306,003 | B2 * | 11/2012 | Ramesh | H04W 74/0866 370/338 |
| 2007/0171933 | A1 * | 7/2007 | Sammour | H04W 74/0816 370/447 |

(Continued)

FOREIGN PATENT DOCUMENTS

EP    1396111 A2    3/2004

OTHER PUBLICATIONS

International Search Report and Written Opinion—PCT/US2014/063188—ISA/EPO—Mar. 10, 2015.

(Continued)

*Primary Examiner* — Maharishi Khirodhar
(74) *Attorney, Agent, or Firm* — Knobbe, Martens, Olson & Bear, LLP

(57) ABSTRACT

The present application relates generally to wireless communications, and more specifically to systems, methods, and devices for deferral based on transmission opportunity (TXOP) information. One aspect of the present disclosure provides An apparatus configured to wirelessly communicate. The apparatus includes a processing system configured to obtain a deferral-related parameter from a packet transmitted on a shared wireless access medium and decide whether to defer transmission on the shared wireless access medium based, at least in part, on the at least one deferral-related parameter.

31 Claims, 10 Drawing Sheets

(56) References Cited

U.S. PATENT DOCUMENTS

| | | | |
|---|---|---|---|
| 2009/0061885 A1* | 3/2009 | Eastlake, III | H04W 74/002 455/450 |
| 2011/0103352 A1* | 5/2011 | Wentink | H04W 74/008 370/336 |
| 2012/0230310 A1* | 9/2012 | Roy | H04W 74/0808 370/338 |
| 2013/0235737 A1* | 9/2013 | Merlin | H04W 52/245 370/252 |
| 2015/0009907 A1 | 1/2015 | Merlin et al. | |
| 2015/0078299 A1 | 3/2015 | Barriac et al. | |
| 2015/0131640 A1* | 5/2015 | Seok | H04W 28/06 370/338 |

OTHER PUBLICATIONS

Marinier P, et al., "Power Control in 802.11 Wireless LANs", 2006 IEEE 64th Vehicular Technology Conference : VTC 2006—Fall ; Sep. 25-28, 2006, Montreal, Quebec, Canada, Piscataway, NJ : IEEE Operations Center, Sep. 1, 2006 (Sep. 1, 2006), pp. 1-5, XP031051556.

Ray S, et al., "On False Blocking in RTS/CTS-Based Multihop Wireless Networks", IEEE Transactions on Vehicular Technology, IEEE Service Center, Piscataway, NJ, US, vol. 56, No. 2, Mar. 1, 2007 (Mar. 1, 2007), pp. 849-862, XP011175783.

\* cited by examiner

- PRIOR ART -

WIRELESS COMMUNICATIONS DEFERRAL BASED ON TRANSMISSION OPPORTUNITY

CROSS-REFERENCE TO RELATED APPLICATIONS

This application claims priority under 35 U.S.C. §119(e) to U.S. Provisional App. No. 61/898,951, filed Nov. 1, 2013, which is incorporated by reference herein in its entirety.

FIELD

The present application relates generally to wireless communications, and more specifically to systems, methods, and devices for deferral based on device identity information.

BACKGROUND

In many telecommunication systems, communications networks are used to exchange messages among several interacting spatially-separated devices. Networks can be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include improved communications between access points and stations in a wireless network.

One aspect of the present disclosure provides An apparatus configured to wirelessly communicate. The apparatus includes a processing system configured to obtain a deferral-related parameter from a packet transmitted on a shared wireless access medium and decide whether to defer transmission on the shared wireless access medium based, at least in part, on the at least one deferral-related parameter.

In various embodiments, the processing system can be further configured to use one or more threshold values associated with the at least one deferral-related parameter in making the decision. In various embodiments, the processing system can be configured to decide whether to defer transmission on the shared wireless access medium further based on a list of overlapping basic service sets (OBSSs).

In various embodiments, the at least one deferral-related parameter can be received in a ready-to-send (RTS) frame. In various embodiments, the at least one deferral-related parameter can include at least one of: a planned modulation and coding scheme (MCS) for a subsequent data transmission during a transmission opportunity (TXOP), an estimated MCS for the subsequent data transmission during the TXOP, and an indication allowing or disallowing non-deferral to the subsequent data transmission during the TXOP. In various embodiments, the processing system can be configured not to defer transmissions during the TXOP for which the RTS frame has been received, and no clear-to-send (CTS) frame has been received.

In various embodiments, the at least one deferral-related parameter can be received in a clear-to-send (CTS) frame. In various embodiments, the at least one deferral-related parameter can include at least one of an indication of an allowed clear channel assessment (CCA) offset and a default CCA threshold applicable during a transmission opportunity (TXOP). In various embodiments, the processing system can be configured to determine whether the CTS has a power level below the default CCA threshold plus the offset. The processing system can further be configured to not to defer transmissions during the TXOP.

In various embodiments, the processing system can be configured to at least partially align an end of data transmission with the end of a transmission opportunity (TXOP).

Another aspect provides another wireless communication device for wireless communications. The apparatus includes a processing system in a wireless communication device, the processing system configured to generate a packet including at least one deferral-related parameter to be used by another wireless communication device for deciding whether or not the other wireless communication device should defer transmitting on a shared wireless access medium and provide the packet to the other wireless communication device.

In various embodiments, processing system can be further configured to include the at least one deferral-related parameter in a ready-to-send (RTS) frame. In various embodiments, the at least one deferral-related parameter can include at least one of: a planned modulation and coding scheme (MCS) for a subsequent data transmission during a transmission opportunity (TXOP), an estimated MCS for the subsequent data transmission during the TXOP, and an indication allowing or disallowing non-deferral to the subsequent data transmission during the TXOP.

In various embodiments, processing system can be further configured to include the at least one deferral-related parameter in a clear-to-send (CTS) frame. In various embodiments, the at least one deferral-related parameter can include at least one of an indication of an allowed clear channel assessment (CCA) offset and a default CCA threshold applicable during a transmission opportunity (TXOP).

Another aspect provides another wireless communication device for wireless communications. The apparatus includes means for obtaining a deferral-related parameter from a packet transmitted on a shared wireless access medium. The apparatus further includes means for deciding whether to defer transmission on the shared wireless access medium based, at least in part, on the at least one deferral-related parameter.

Another aspect provides another wireless communication device for wireless communications. The apparatus includes means for generating a packet including at least one deferral-related parameter to be used by another wireless communication device for deciding whether or not the other wireless communication device should defer transmitting on a shared wireless access medium. The apparatus further includes means for providing the packet to the other wireless communication device.

Another aspect provides a method of wireless communications. The method includes obtaining a deferral-related parameter from a packet transmitted on a shared wireless access medium. The method further includes deciding whether to defer transmission on the shared wireless access medium based, at least in part, on the at least one deferral-related parameter.

Another aspect provides another method of wireless communications. The method includes generating a packet including at least one deferral-related parameter to be used by another wireless communication device for deciding whether or not the other wireless communication device should defer transmitting on a shared wireless access medium. The method further includes providing the packet to the other wireless communication device.

Another aspect provides a computer program product for wireless communications. The product includes a computer-readable medium having instructions stored thereon, the instructions executable by an apparatus for obtaining a deferral-related parameter from a packet transmitted on a shared wireless access medium. The medium further include code that, when executed, causes the apparatus to deciding whether to defer transmission on the shared wireless access medium based, at least in part, on the at least one deferral-related parameter.

Another aspect provides another computer program product for wireless communications. The product includes a computer-readable medium having instructions stored thereon, the instructions executable by an apparatus for generating a packet including at least one deferral-related parameter to be used by another wireless communication device for deciding whether or not the other wireless communication device should defer transmitting on a shared wireless access medium. The medium further includes code that, when executed, causes the apparatus to providing the packet to the other wireless communication device.

Another aspect provides a wireless node. The node includes a receiver configured to receive on a shared wireless access medium, a packet having at least one deferral-related parameter. The node further includes a processing system configured to decide whether to defer transmission on the medium based, at least in part, on the deferral-related parameter.

Another aspect provides another wireless node. The node includes a processing system in a wireless communication device, the processing system configured to generate a packet having at least one deferral-related parameter for a receiving device to use in deciding whether or not to defer transmitting on a shared wireless access medium. The node further includes a transmitter configured to transmit the packet on the shared wireless access medium.

Numerous other aspects are provided including methods, apparatus, systems, computer program products, and processing systems.

DETAILED DESCRIPTION

Figure 1:
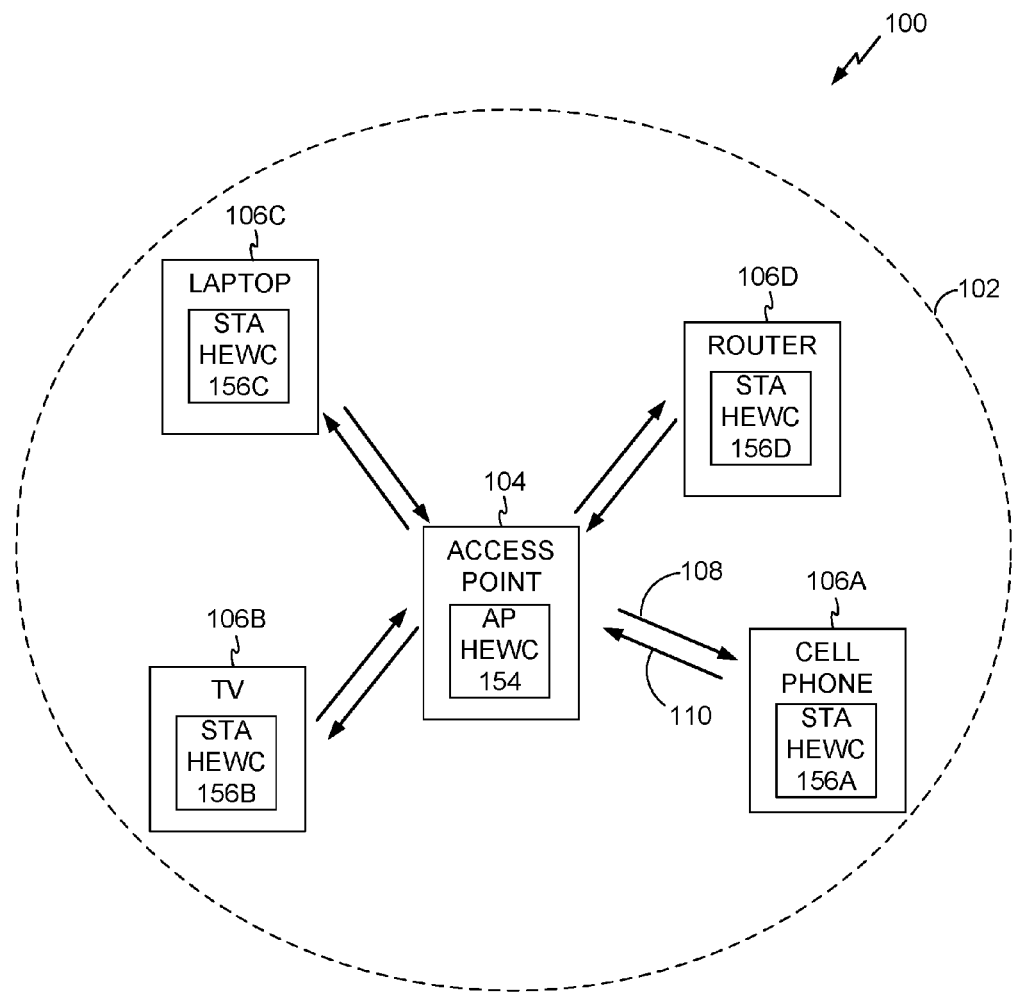
FIG. 1 shows an exemplary wireless communication system in which aspects of the present disclosure can be employed.

Various aspects of the novel systems, apparatuses, and methods are described more fully hereinafter with reference to the accompanying drawings. This disclosure can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus can be implemented or a method can be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein can be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies can include various types of wireless local area networks (WLANs). A WLAN can be used to interconnect nearby devices together, employing widely used networking protocols. The various aspects described herein can apply to any communication standard, such as a wireless protocol.

In some aspects, wireless signals can be transmitted according to a high-efficiency 802.11 protocol using orthogonal frequency-division multiplexing (OFDM), direct-sequence spread spectrum (DSSS) communications, a combination of OFDM and DSSS communications, or other schemes. Implementations of the high-efficiency 802.11 protocol can be used for Internet access, sensors, metering, smart grid networks, or other wireless applications. Advantageously, aspects of certain devices implementing the high-efficiency 802.11 protocol using the techniques disclosed herein can include allowing for increased peer-to-peer services (e.g., Miracast, WiFi Direct Services, Social WiFi, etc.) in the same area, supporting increased per-user minimum throughput requirements, supporting more users, providing improved outdoor coverage and robustness, and/or consuming less power than devices implementing other wireless protocols.

In some implementations, a WLAN includes various devices which are the components that access the wireless network. For example, there can be two types of devices: access points ("APs") and clients (also referred to as stations, or "STAs"). In general, an AP can serve as a hub or base station for the WLAN and a STA serves as a user of the WLAN. For example, a STA can be a laptop computer, a personal digital assistant (PDA), a mobile phone, etc. In an example, a STA connects to an AP via a WiFi (e.g., IEEE 802.11 protocol) compliant wireless link to obtain general connectivity to the Internet or to other wide area networks. In some implementations a STA can also be used as an AP.

An access point ("AP") can also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" can also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal can comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein can be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein can implement a high-efficiency 802.11 standard, for example. Such devices, whether used as a STA or AP or other device, can be used for smart metering or in a smart grid network. Such devices can provide sensor applications or be used in home automation. The devices can instead or in addition be used in a healthcare context, for example for personal healthcare. They can also be used for surveillance, to enable extended-range Internet connectivity (e.g., for use with hotspots), or to implement machine-to-machine communications.

FIG. 1 shows an exemplary wireless communication system 100 in which aspects of the present disclosure can be employed. The wireless communication system 100 can operate pursuant to a wireless standard, for example a high-efficiency 802.11 standard. The wireless communication system 100 can include an AP 104, which communicates with STAs 106.

A variety of processes and methods can be used for transmissions in the wireless communication system 100 between the AP 104 and the STAs 106. For example, signals can be sent and received between the AP 104 and the STAs 106 in accordance with OFDM/OFDMA techniques. If this is the case, the wireless communication system 100 can be referred to as an OFDM/OFDMA system. Alternatively, signals can be sent and received between the AP 104 and the STAs 106 in accordance with code division multiple access (CDMA) techniques. If this is the case, the wireless communication system 100 can be referred to as a CDMA system.

A communication link that facilitates transmission from the AP 104 to one or more of the STAs 106 can be referred to as a downlink (DL) 108, and a communication link that facilitates transmission from one or more of the STAs 106 to the AP 104 can be referred to as an uplink (UL) 110. Alternatively, a downlink 108 can be referred to as a forward link or a forward channel, and an uplink 110 can be referred to as a reverse link or a reverse channel.

The AP 104 can act as a base station and provide wireless communication coverage in a basic service area (BSA) 102. The AP 104 along with the STAs 106 associated with the AP 104 and that use the AP 104 for communication can be referred to as a basic service set (BSS). It should be noted that the wireless communication system 100 may not have a central AP 104, but rather can function as a peer-to-peer network between the STAs 106. Accordingly, the functions of the AP 104 described herein can alternatively be performed by one or more of the STAs 106.

In some aspects, a STA 106 can be required to associate with the AP 104 in order to send communications to and/or receive communications from the AP 104. In one aspect, information for associating is included in a broadcast by the AP 104. To receive such a broadcast, the STA 106 can, for example, perform a broad coverage search over a coverage region. A search can also be performed by the STA 106 by sweeping a coverage region in a lighthouse fashion, for example. After receiving the information for associating, the STA 106 can transmit a reference signal, such as an association probe or request, to the AP 104. In some aspects, the AP 104 can use backhaul services, for example, to communicate with a larger network, such as the Internet or a public switched telephone network (PSTN).

In an embodiment, the AP 104 includes an AP high-efficiency wireless component (HEWC) 154. The AP HEWC 154 can perform some or all of the operations described herein to enable communications between the AP 104 and the STAs 106 using the high-efficiency 802.11 protocol. The functionality of the AP HEWC 154 is described in greater detail below with respect to FIGS. 2B, 3, 4, and 5.

Alternatively or in addition, the STAs 106 can include a STA HEWC 156. The STA HEWC 156 can perform some or all of the operations described herein to enable communications between the STAs 106 and the AP 104 using the high-frequency 802.11 protocol. The functionality of the STA HEWC 156 is described in greater detail below with respect to FIGS. 2B, 3, 4, and 5.

Figure 2A:
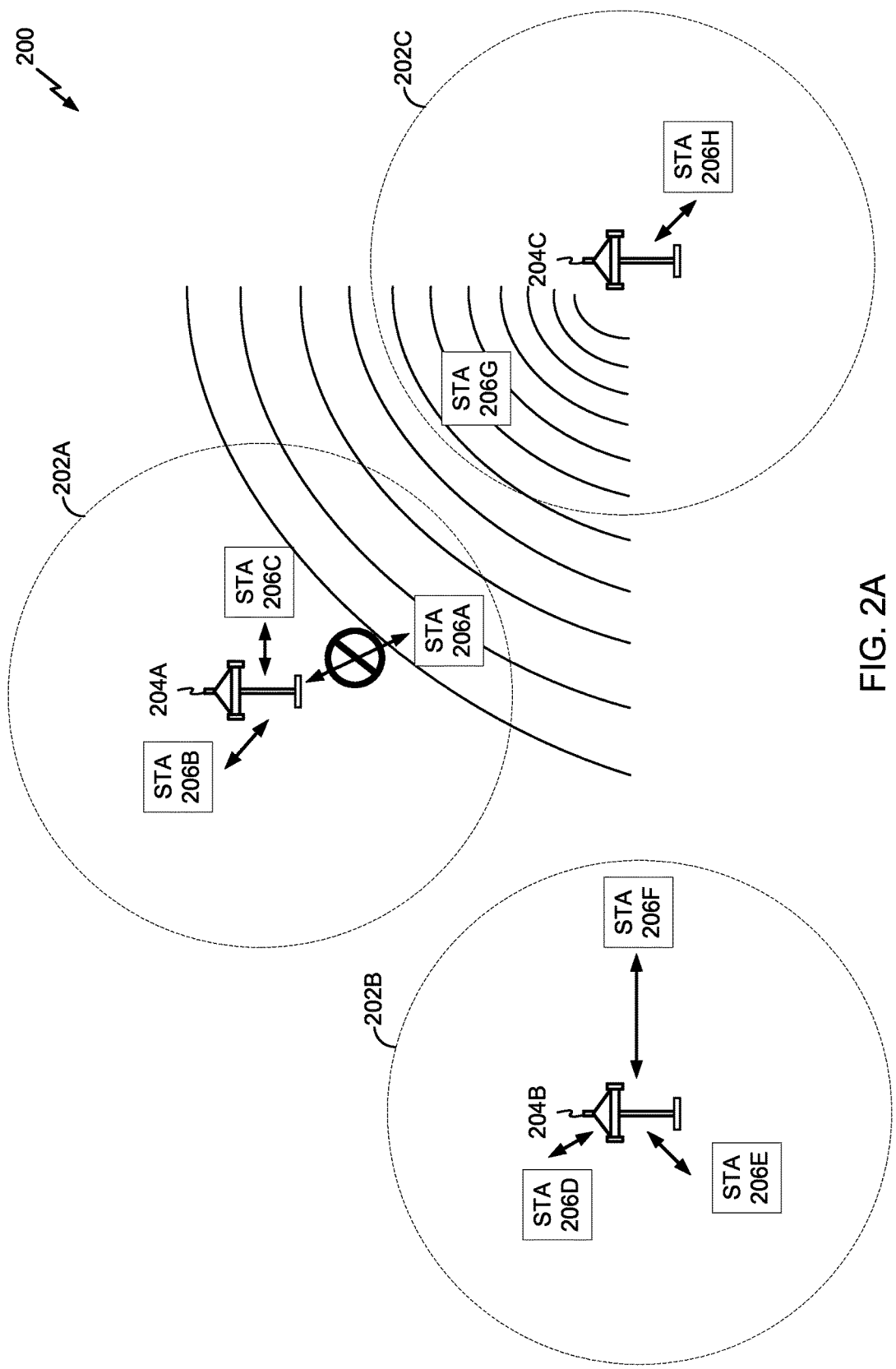
FIG. 2A shows a wireless communication system in which multiple wireless communication networks are present.

In some circumstances, a BSA can be located near other BSAs. For example, FIG. 2A shows a wireless communication system 200 in which multiple wireless communication networks are present. As illustrated in FIG. 2A, BSAs 202A, 202B, and 202C can be physically located near each other. Despite the close proximity of the BSAs 202A-C, the APs 204A-C and/or STAs 206A-H can each communicate using the same spectrum. Thus, if a device in the BSA 202C (e.g., the AP 204C) is transmitting data, devices outside the BSA 202C (e.g., APs 204A-B or STAs 206A-F) can sense the communication on the medium.

Generally, wireless networks that use a regular 802.11 protocol (e.g., 802.11a, 802.11b, 802.11g, 802.11n, etc.) operate under a carrier sense multiple access (CSMA) mechanism for medium access. According to CSMA, devices sense the medium and only transmit when the medium is sensed to be idle. Thus, if the APs 204A-C and/or STAs 206A-H are operating according to the CSMA mechanism and a device in the BSA 202C (e.g., the AP 204C) is transmitting data, then the APs 204A-B and/or STAs 206A-F outside of the BSA 202C may not transmit over the medium even though they are part of a different BSA.

FIG. 2A illustrates such a situation. As illustrated in FIG. 2A, AP 204C is transmitting over the medium. The transmission is sensed by STA 206G, which is in the same BSA 202C as the AP 204C, and by STA 206A, which is in a different BSA than the AP 204C. While the transmission can be addressed to the STA 206G and/or only STAs in the BSA 202C, STA 206A nonetheless may not be able to transmit or receive communications (e.g., to or from the AP 204A) until the AP 204C (and any other device) is no longer transmitting on the medium. Although not shown, the same can apply to STAs 206D-F in the BSA 202B and/or STAs 206B-C in the BSA 202A as well (e.g., if the transmission by the AP 204C is stronger such that the other STAs can sense the transmission on the medium).

The use of the CSMA mechanism then creates inefficiencies because some APs or STAs outside of a BSA can be able to transmit data without interfering with a transmission made by an AP or STA in the BSA. As the number of active wireless devices continues to grow, the inefficiencies can begin to significantly affect network latency and throughput. For example, significant network latency issues can appear in apartment buildings, in which each apartment unit can include an access point and associated stations. In fact, each apartment unit can include multiple access points, as a resident can own a wireless router, a video game console with wireless media center capabilities, a television with wireless media center capabilities, a cell phone that can act like a personal hot-spot, and/or the like. Correcting the inefficiencies of the CSMA mechanism can then be vital to avoid latency and throughput issues and overall user dissatisfaction.

Such latency and throughput issues may not even be confined to residential areas. For example, multiple access points can be located in airports, subway stations, and/or other densely-populated public spaces. Currently, WiFi access can be offered in these public spaces, but for a fee. If the inefficiencies created by the CSMA mechanism are not corrected, then operators of the wireless networks can lose customers as the fees and lower quality of service begin to outweigh any benefits.

Accordingly, the high-efficiency 802.11 protocol described herein can allow for devices to operate under a modified mechanism that minimizes these inefficiencies and increases network throughput. Such a mechanism is described below with respect to FIGS. 2B, 3, and 4. Additional aspects of the high-efficiency 802.11 protocol are described below with respect to FIGS. 5-9.

Figure 2B:
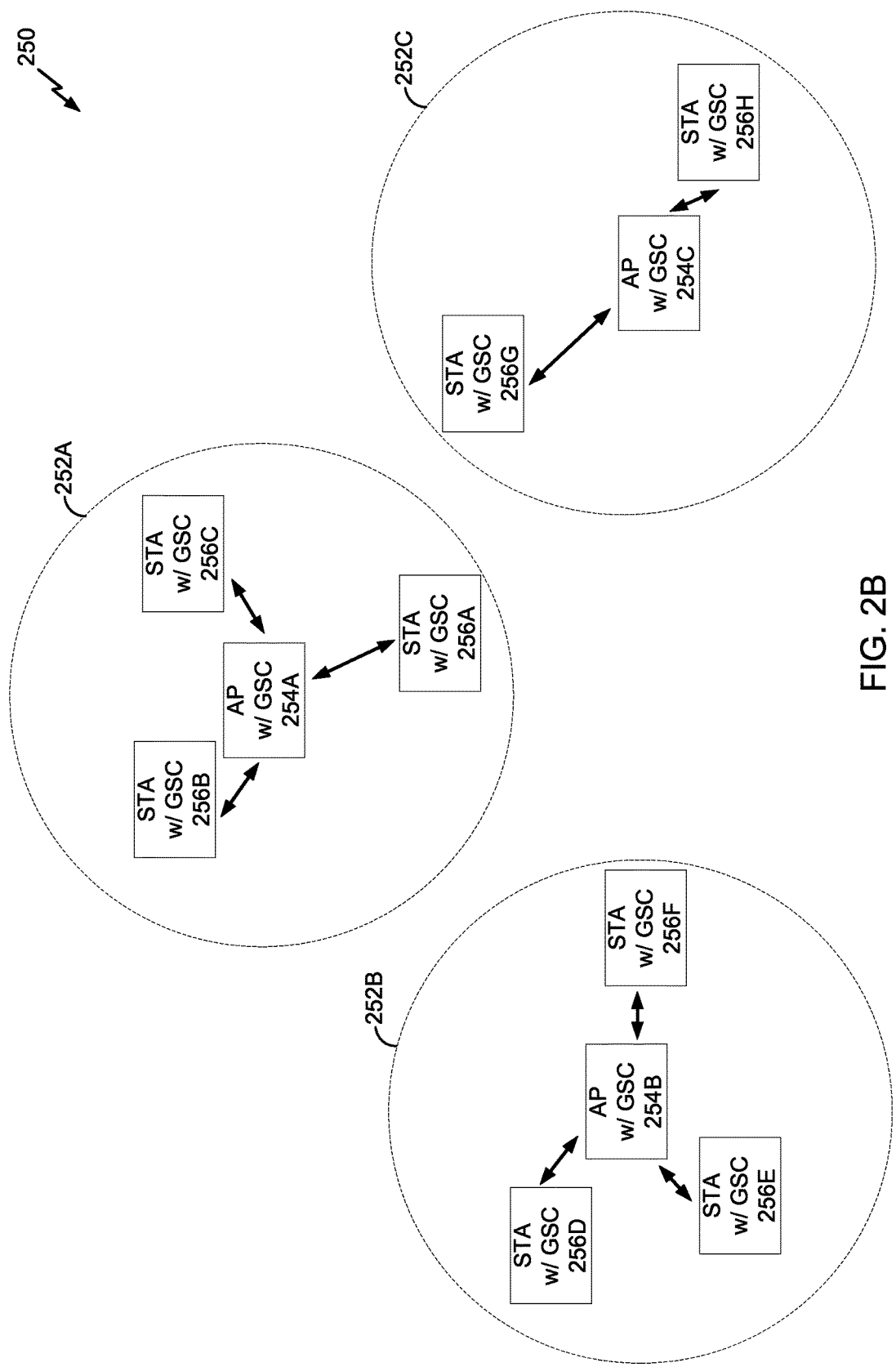
FIG. 2B shows another wireless communication system in which multiple wireless communication networks are present.

FIG. 2B shows a wireless communication system 250 in which multiple wireless communication networks are present. Unlike the wireless communication system 200 of FIG. 2A, the wireless communication system 250 can operate pursuant to the high-efficiency 802.11 standard discussed herein. The wireless communication system 250 can include an AP 254A, an AP 254B, and an AP 254C. The AP 254A can communicate with STAs 256A-C, the AP 254B can communicate with STAs 256D-F, and the AP 254C can communicate with STAs 256G-H.

A variety of processes and methods can be used for transmissions in the wireless communication system 250 between the APs 254A-C and the STAs 256A-H. For example, signals can be sent and received between the APs 254A-C and the STAs 256A-H in accordance with OFDM/OFDMA techniques or CDMA techniques.

The AP 254A can act as a base station and provide wireless communication coverage in a BSA 252A. The AP 254B can act as a base station and provide wireless communication coverage in a BSA 252B. The AP 254C can act as a base station and provide wireless communication coverage in a BSA 252C. It should be noted that each BSA 252A, 252B, and/or 252C may not have a central AP 254A, 254B, or 254C, but rather can allow for peer-to-peer communications between one or more of the STAs 256A-H. Accordingly, the functions of the AP 254A-C described herein can alternatively be performed by one or more of the STAs 256A-H.

In an embodiment, the APs 254A-C and/or STAs 256A-H include a high-efficiency wireless component. As described herein, the high-efficiency wireless component can enable communications between the APs and STAs using the high-efficiency 802.11 protocol. In particular, the high-efficiency wireless component can enable the APs 254A-C and/or STAs 256A-H to use a modified mechanism that minimizes the inefficiencies of the CSMA mechanism (e.g., enables concurrent communications over the medium in situations in which interference would not occur). The high-efficiency wireless component is described in greater detail below with respect to FIG. 4.

As illustrated in FIG. 2B, the BSAs 252A-C are physically located near each other. When, for example, AP 254A and STA 256B are communicating with each other, the communication can be sensed by other devices in BSAs 252B-C. However, the communication may only interfere with certain devices, such as STA 256F and/or STA 256G. Under CSMA, AP 254B would not be allowed to communicate with STA 256E even though such communication would not interfere with the communication between AP 254A and STA 256B. Thus, the high-efficiency 802.11 protocol operates under a modified mechanism that differentiates between devices that can communicate concurrently and devices that cannot communicate concurrently. Such classification of devices can be performed by the high-efficiency wireless component in the APs 254A-C and/or the STAs 256A-H.

In an embodiment, the determination of whether a device can communicate concurrently with other devices is based on a location of the device. For example, a STA that is located near an edge of the BSA can be in a state or condition such that the STA cannot communicate concurrently with other devices. As illustrated in FIG. 2B, STAs 206A, 206F, and 206G can be devices that are in a state or condition in which they cannot communicate concurrently with other devices. Likewise, a STA that is located near the center of the BSA can be in a station or condition such that the STA can communicate concurrently with other devices. As illustrated in FIG. 2, STAs 206B, 206C, 206D, 206E, and 206H can be devices that are in a state or condition in which they can communicate concurrently with other devices. Note that the classification of devices is not permanent. Devices can transition between being in a state or condition such that they can communicate concurrently and being in a state or condition such that they cannot communicate concurrently (e.g., devices can change states or conditions when in motion, when associating with a new AP, when disassociating, etc.).

Furthermore, devices can be configured to behave differently based on whether they are ones that are or are not in a state or condition to communicate concurrently with other devices. For example, devices that are in a state or condition such that they can communicate concurrently can communicate within the same spectrum. However, devices that are in a state or condition such that they cannot communicate concurrently can employ certain techniques, such as spatial multiplexing or frequency domain multiplexing, in order to communicate over the medium. The controlling of the behavior of the devices can be performed by the high-efficiency wireless component in the APs 254A-C and/or the STAs 256A-H.

In an embodiment, devices that are in a state or condition such that they cannot communicate concurrently use spatial multiplexing techniques to communicate over the medium. For example, power and/or other information can be embedded within the preamble of a packet transmitted by another device. A device in a state or condition such that the device cannot communicate concurrently can analyze the preamble when the packet is sensed on the medium and decide whether or not to transmit based on a set of rules.

Figure 3:
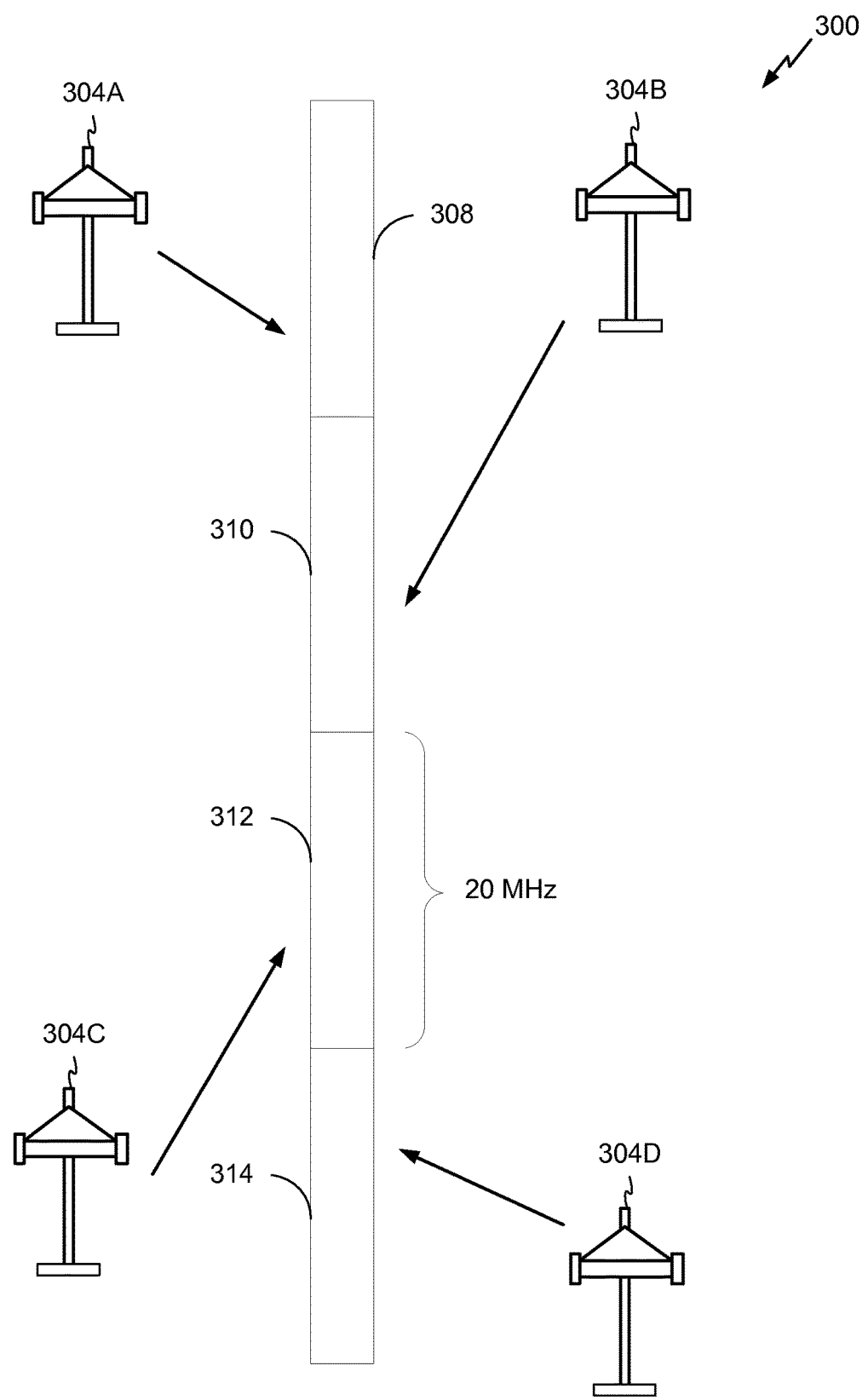
FIG. 3 shows frequency multiplexing techniques that can be employed within the wireless communication systems of FIGS. 1 and 2B.

In another embodiment, devices that are in a state or condition such that they cannot communicate concurrently use frequency domain multiplexing techniques to communicate over the medium. FIG. 3 shows frequency multiplexing techniques that can be employed within the wireless communication systems 100 of FIG. 1 and 250 of FIG. 2B. As illustrated in FIG. 3, an AP 304A, 304B, 304C, and 304D can be present within a wireless communication system 300. Each of the APs 304A, 304B, 304C, and 304D can be associated with a different BSA and include the high-efficiency wireless component described herein.

As an example, the bandwidth of the communication medium can be 80 MHz. Under the regular 802.11 protocol, each of the APs 304A, 304B, 304C, and 304D and the STAs associated with each respective AP attempt to communicate using the entire bandwidth, which can reduce throughput. However, under the high-efficiency 802.11 protocol using frequency domain multiplexing, the bandwidth can be divided into four 20 MHz segments 308, 310, 312, and 314 (e.g., channels), as illustrated in FIG. 3. The AP 304A can be associated with segment 308, the AP 304B can be associated with segment 310, the AP 304C can be associated with segment 312, and the AP 304D can be associated with segment 314.

In an embodiment, when the APs 304A-D and the STAs that are in a state or condition such that the STAs can communicate concurrently with other devices (e.g., STAs near the center of the BSA) are communicating with each other, then each AP 304A-D and each of these STAs can communicate using a portion of or the entire 80 MHz medium. However, when the APs 304A-D and the STAs that are in a state or condition such that the STAs cannot communicate concurrently with other devices (e.g., STAs near the edge of the BSA) are communicating with each other, then AP 304A and its STAs communicate using 20 MHz segment 308, AP 304B and its STAs communicate using 20 MHz segment 310, AP 304C and its STAs communicate using 20 MHz segment 312, and AP 304D and its STAs communicate using 20 MHz segment 314. Because the segments 308, 310, 312, and 314 are different portions of the communication medium, a first transmission using a first segment would not interference with a second transmission using a second segment.

Thus, APs and/or STAs, even those that are in a state or condition such that they cannot communicate concurrently with other devices when following 11 ac or older protocols, if they include the high-efficiency wireless component, they can communicate concurrently with other APs and STAs without interference. Accordingly, the throughput of the wireless communication system 300 can be increased. In the case of apartment buildings or densely-populated public spaces, APs and/or STAs that use the high-efficiency wireless component can experience reduced latency and increased network throughput even as the number of active wireless devices increases, thereby improving user experience.

Figure 4:
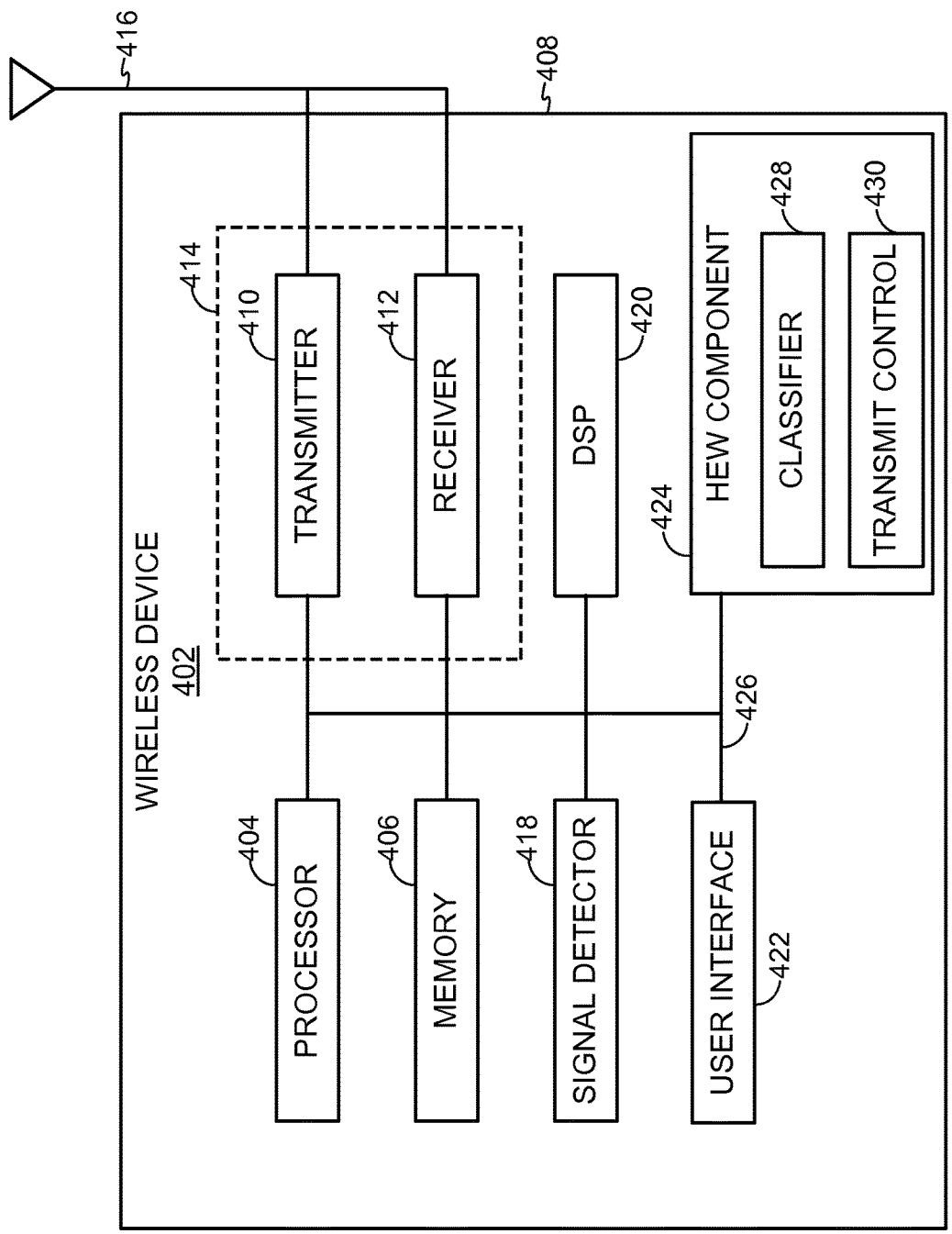
FIG. 4 shows a functional block diagram of an exemplary wireless device that can be employed within the wireless communication systems of FIGS. 1, 2B, and 3.

FIG. 4 shows an exemplary functional block diagram of a wireless device 402 that can be employed within the wireless communication systems 100, 250, and/or 300 of FIGS. 1, 2B, and 3. The wireless device 402 is an example of a device that can be configured to implement the various methods described herein. For example, the wireless device 402 can comprise the AP 104, one of the STAs 106, one of the APs 254, one of the STAs 256, and/or one of the APs 304.

The wireless device 402 can include a processor 404 which controls operation of the wireless device 402. The processor 404 can also be referred to as a central processing unit (CPU). Memory 406, which can include both read-only memory (ROM) and random access memory (RAM), can provide instructions and data to the processor 404. A portion of the memory 406 can also include non-volatile random access memory (NVRAM). The processor 404 typically performs logical and arithmetic operations based on program instructions stored within the memory 406. The instructions in the memory 406 can be executable to implement the methods described herein.

The processor 404 can comprise or be a component of a processing system implemented with one or more processors. The one or more processors can be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system can also include machine-readable media for storing software. Software shall be construed broadly to mean any type of instructions, whether referred to as software, firmware, middleware, microcode, hardware description language, or otherwise. Instructions can include code (e.g., in source code format, binary code format, executable code format, or any other suitable format of code). The instructions, when executed by the one or more processors, cause the processing system to perform the various functions described herein.

The wireless device 402 can also include a housing 408 that can include a transmitter 410 and/or a receiver 412 to allow transmission and reception of data between the wireless device 402 and a remote location. The transmitter 410 and receiver 412 can be combined into a transceiver 414. An antenna 416 can be attached to the housing 408 and electrically coupled to the transceiver 414. The wireless device 402 can also include (not shown) multiple transmitters, multiple receivers, multiple transceivers, and/or multiple antennas.

The wireless device 402 can also include a signal detector 418 that can be used in an effort to detect and quantify the level of signals received by the transceiver 414. The signal detector 418 can detect such signals as total energy, energy per subcarrier per symbol, power spectral density and other signals. The wireless device 402 can also include a digital signal processor (DSP) 420 for use in processing signals. The DSP 420 can be configured to generate a packet for transmission. In some aspects, the packet can comprise a physical layer data unit (PPDU).

The wireless device 402 can further comprise a user interface 422 in some aspects. The user interface 422 can comprise a keypad, a microphone, a speaker, and/or a display. The user interface 422 can include any element or component that conveys information to a user of the wireless device 402 and/or receives input from the user.

The wireless devices 402 can further comprise a high-efficiency wireless component 424 in some aspects. The high-efficiency wireless component 424 can include a classifier unit 428 and a transmit control unit 430. As described herein, the high-efficiency wireless component 424 can enable APs and/or STAs to use a modified mechanism that minimizes the inefficiencies of the CSMA mechanism (e.g., enables concurrent communications over the medium in situations in which interference would not occur).

The modified mechanism can be implemented by the classifier unit 428 and the transmit control unit 430. In an embodiment, the classifier unit 428 determines which devices are in a state or condition such that they can communicate concurrently with other devices and which devices are in a state or condition such that they cannot communicate concurrently with other devices without additional orthogonalization in time, frequency, or space. In an embodiment, the transmit control unit 430 controls the behavior of devices. For example, the transmit control unit 430 can allow certain devices to transmit concurrently on the same medium and allow other devices to transmit using a spatial multiplexing or frequency domain multiplexing technique. The transmit control unit 430 can control the behavior of devices based on the determinations made by the classifier unit 428.

The various components of the wireless device 402 can be coupled together by a bus system 426. The bus system 426 can include a data bus, for example, as well as a power bus, a control signal bus, and a status signal bus in addition to the data bus. Those of skill in the art will appreciate the components of the wireless device 402 can be coupled together or accept or provide inputs to each other using some other mechanism.

Although a number of separate components are illustrated in FIG. 4, those of skill in the art will recognize that one or more of the components can be combined or commonly implemented. For example, the processor 404 can be used to implement not only the functionality described above with respect to the processor 404, but also to implement the functionality described above with respect to the signal detector 418 and/or the DSP 420. Further, each of the components illustrated in FIG. 4 can be implemented using a plurality of separate elements.

In some implementations, resources and operational modes of APs/STAs in networks with dense deployments of multiple BSSs are coordinated to reduce interference. In some aspects, one or more dimensions including time, frequency, space, and power are coordinated between APs/STAs. In some aspects, coordination messages are sent between APs/STAs. In some aspects, specific enhancements to 802.11ah scheduling and 802.11aa coordination protocol are employed.

Coordination can be achieved as explicit communication across APs/STAs of different BSSs. For example, via messages exchanged over the air or messages exchanged over a separate communication mean (e.g., cable backhaul connection). Messages can be exchanged directly between APs, between APs via STAs, directly between STAs, or between STAs via AP.

Coordination can be achieved as implicit communications/measurements based on observation of the traffic on the medium. For example, packets can be enhanced to carry partial information that can help the coordination Coordination final decisions can be made by a central informed controller, at each AP, with a distributed heuristic, or at each STA, based on exchanged information.

Deferral Based on BSSID Information

There can be cases in WiFi networks where it is beneficial for nodes in overlapping BSSs (OBSSs) to transmit concurrently. However, current WiFi standards have strict deferral rules. Also, there is currently no good way for a node to know whether a packet is from an OBSSs AP to its own AP. This lack of information can cause problems when trying to implement new deferral rules for the purpose of allowing concurrent transmissions across OBSSs.

Currently, there are limitations to special reuse. In some cases, deferral rules can be too conservative. In such cases, a network allocation vector (NAV) or a clear channel assessment (CCA) are set, preventing transmissions that would be acceptable. Physical (PHY) CCA (energy or packet detect) levels can be fixed by standard and not adapted to the scenario. Virtual carrier sensing (e.g., network allocation vector or "NAV") can be effectively active at the same sensitivity level of the payload modulation and coding scheme (MCS) where the NAV can be sent.

In other cases, deferral rules can be too aggressive. NAV or CCA can allow transmissions that should not have happened. NAV may not be decoded because the frame failed SIG or Data portions. Preamble detection may not be triggered because signal-to-noise-plus-interference ratio (SINR) may not sufficient. Additionally, packet detection and/or energy detection (ED) levels can be too high for the specific interfering scenario.

In yet other cases, irrespective of CCA/NAV levels, a node can be stuck receiving "useless" packets. Useless packets can be packets that are not intended for the receiver or useless packets can be packets that are too weak for the payload to be decoded.

Thus, it can be desirable to have deferral rules which can be implemented once a node is able to differentiate between packets originating from its own BSS and packets originating from OBSSs. Certain aspects of this disclosure discuss methods for enabling a node to perform such differentiation.

Certain aspects of this disclosure describe enhancements of deferral rules. One aspect can be to improve the CCA behavior. One way to improve CCA behavior can be to include deferral related indications in every transmitted packet, preferably in PHY preamble. Parameter values can be decided by the transmitter STA or by APD. Another way to improve CCA behavior can be to define new criteria for the deferral upon a packet reception, based on deferral related information included in a received packet, and additional rules defined by the access point (AP). APs define and communicate to the stations (STAs) the deferral rules, and can also indicate to STAs how to set the deferral parameters to be inserted in each transmitted packet. APs can coordinate in the setting of the rules and the parameters.

According to certain aspects, deferral related indications in every transmitted packet can include an identifier of the BSS, an identifier of the transmitter, an identifier of the receiver of the packet, a transmitter (TX) power indication, an indication of the "importance" of the packet (whether it can be dropped or not), an indication of the quality of service (QoS) of the packet, or an indication of the RX power level at which receivers are supposed to defer (CCA level).

Information to be included in the transmitted packet can be signaled by AP to the STA, for example, by a BSS identifier, that identifies which packets can be classified as high importance.

Certain aspects of the present disclosure define new criteria for the deferral upon a packet reception. For example, a STA may be allowed to reuse the wireless medium (e.g., allowed not to defer to the received packet) if the packet matches one or more conditions. In some cases, a STA may not be allowed to reuse the wireless medium if the packet matches any condition related to the information included in the preamble.

For example, conditions related to the information included in the preamble (or other control frames) can include: whether a packet BSS identifier (ID) is from an OBSS or from certain selected OBSSs (e.g., a list can provided by an AP), whether TX/RX identifiers match certain RX/TX identifier (e.g., which can be signaled by an AP), whether the TX power indicated in the packet is <X (e.g., with X indicated by the AP or packet, where X can be higher for OBSS packets than for non-OBSS packets), whether the RX power is <X (e.g., with X indicated by the AP or packet), whether the received packet is a DL and/or UL packet, whether the packet includes an indication that non-deferral is allowed (e.g., medium-sharing enabled/disabled on a per-BSS basis), whether the packet is of a specific type (e.g., control packets, data packets, etc.). In some cases, a STA can be allowed to reuse the wireless medium if an "importance" indication allows for it or if the STA is planning to use the medium for a transmission with a certain QoS (e.g., as compared to the QoS indication in the received packet).

In some cases, a STA can be allowed to not defer to the received packet if the packet matches one or more conditions related to additional information derived from the PHY preamble. For example, a STA can be allowed not to defer if receive power can be below a certain threshold (indicated by AP or standard), or if the BW of the packet can be within a certain range (indicated by AP), or if the MCS of the packet can be within a certain range (indicated by AP), or if the duration of the packet is >X (indicated by AP).

In some cases, a node may not defer to packets if the packets arrive within a certain time and/or frequency, for example when rules can be defined to be valid only within a restricted access window (RAW). A node may not defer to packets in a certain category, wherein the category can refer, for example, to the interference condition of the STA. In some cases, whether a packet is in such a category can be determined by the STA. For example, the category can be based on received signal strength indication (RSSI) with its own AP and/or based on RSSI with interferers. The category can also be determined by the AP. Other types of categories can also be determined by a transmitting or receiving entity.

A receiving STA can use information in the received packet and additional criteria received from its own AP to determine if a packet can be dropped. If a packet can be dropped, a STA can stop processing the packet after the information is determined (e.g., based on a PHY/MAC header) and can be allowed to transmit. Transmission can be allowed only with certain limitations, such as within a certain duration, which can be fixed and within the duration of the PLCP protocol data unit (PPDU) just dropped. Transmission can also only be allowed with a certain MAX power, need to be preceded by request to send (RTS) and/or clear to send (CTS), with a certain bandwidth (BW), or with a certain destination.

In some cases, an AP can signal any of the parameters needed for implementing the above rules in a beacon, probe response, association response, or in a management frame sent directly to the STAs. A negotiation procedure can be defined and initiated by an AP. For example, the AP can allow STAs to defer according to parameters the AP defines, or base on parameters determined by STAs.

In some cases, APs can coordinate in defining any of the parameters and rules listed above. For example, APs can coordinate regarding what information is to be included in a transmitted packet. As an example, APs can coordinate in an effort to keep BSS identifiers unique among each neighbor, and the importance/QoS of packets (that can be used as a basis for a deferral decision) can be set fairly. APs can also coordinate which rules apply to which STAs and when to apply any of the conditions and/or deferral parameters listed above.

In some cases, deferral rules can be based on BSS Identifier information in a packet. In dense scenarios, transmissions can be interfered by OBSS. For certain links, OBSS interference can be strong such that a concurrent transmission would not be possible. For certain other links, OBSS interference may not be strong and concurrent transmission would be possible. Certain STAs may not need to defer to packets from certain OBSSs. An STA intending to transmit to its own AP can always defer from a packet that can be set by any STA or AP within its own BSS. Therefore, it can be desirable to allow STAs not to defer to packets coming from certain OBSSs.

Certain aspects of the current invention allow for determining the BSSID of a packet. Packets must carry an identifier of the BSS and the identifier should be possibly unique among OBSSs. In 11ac the BSSID of uplink packets can be determined from the partial association identifier (partial_AID) field in the preamble. The BSSID of downlink packets may not be determined from the partial_AID field in the preamble. Ideally, the BSSID should be discernible from the preamble because decoding the actual packet can be less reliable.

Certain aspects of this invention disclose methods for having an indication of a BSS identifier in the preamble of downlink packets. One such method can be to change the partial_AID definition in high-efficiency wireless (HEW) packets so the partial_AID can have some bits as a BSS identifier and some bits for STA identifier. APs can jointly decide what their BSS identifiers are so there may not be overlap. In the uplink (UL) direction the STA identifier indicates the TX station address. In downlink (DL) direction the STA identifier indicates the RX station address.

In some cases, a single bit can be used to indicate if the identifier is UL or DL, otherwise a STA may not know how to use the Partial AID (i.e., is the TX one or the RX one). It can be desirable to only assign AIDs to STAs such that when creating the partial_AID, the last x bits can always be the same. The x bits can be used as a BSS identifier. One bit in the sig or the Q rail can specify whether an AP can be using this encoding. The APs can jointly decide what the x bit can be so there is not overlap. If APs are coordinated, an AP identifier need not be the partial BSSID (which can conflict among neighbors), but could be any identifier per AP agreed among neighbor APs. Alternatively, AID space can be partitioned among neighbors so that AID implicitly identifies the BSS; an AP can need to indicate the partition to the STAs, so that the STA knows which AIDS to filter out.

Certain aspects provide for an example of un-coordinated deferral based on BSSID. For example, according to a first option, standard deferral can be used if a packet is from within BSS. An AP indicates to STAs in its BSS allowance to not defer if a packet can be from any OBSS (or from an OBSS indicated by AP). An AP can indicate to STAs in its BSS allowance to not defer if a receiving STA belongs to a certain group of STAs that may not be allowed to defer to OBSS packets, wherein the classification of STAs can be defined elsewhere. Additionally, an AP can indicate to STAs in its BSS allowance to not defer if RSSI is below a certain value, wherein the value can be indicated by AP. Additionally, an AP can indicate to STAs in its BSS allowance to not defer if RSSI is below a certain value, and packet has a "need not defer" bit set, wherein the transmitter of the packet decides whether to set the bit. No coordination is required. To optimize behavior APs can coordinate for selection of above parameters and/or STAs.

According to a second option of un-coordinated deferral based on BSSID, no coordination is required. Standard deferral can be used if a packet is from within BSS. Modified deferral can be used if packet is from OBSS. There are cases of modified deferral. Case 1: if the RSSI of an intended receiver of a packet can be below a certain value, don't defer. Case 2: if RSSI is below a certain value, and packet has "need not defer" bit set.

Additional elements for a protocol can include having both TX and Rx identifiers in the Partial AID field. In this instance, nodes can keep track of RSSI measurements from other nodes in OBSSs. Since the packets will have TX identifiers, a node can measure RSSI of the transmitter for uplink packets, and therefore get RSSI values for both OBSS STAs and OBSS APs.

In some cases, during different time periods, different deferral rules can be used. For example, during some time periods standard deferral rules can be used. During other time periods, standard deferral can be used if a packet is from within BSS or modified deferral can be used if a packet is from OBSS. There can be several different cases of modified deferral for coordinated deferral based on BSSID, wherein APs coordinate in time. For example, case 1: never defer, case 2: defer only if RSSI of packet is above a threshold, or case 3: defer only if RSSI at intended receiver of packet is above a certain value.

Additional requirements for coordinated deferral based on BSSID, wherein APs can coordinate in time can include that STAs can need to be classified in different groups, wherein different groups can be assigned different time periods and hence different deferral rules. For example, robust users could be given time slots with modified deferral rules. Sensitive users could be given time slots with regular deferral rules. Different time periods could also have additional BW constraints.

Certain aspects provide for an example of coordinated deferral based on BSSID, wherein APs can coordinate across frequency. For example, in different BWs, different deferral rules can be applied. For example, in a BW1 standard deferral rules are used. In a BW2, standard deferral can be used if packet from within BSS or modified deferral can be used if packet is from OBSS. There are several different cases of modified deferral for coordinated deferral based on BSSID, wherein APs coordinate in frequency. For example, case 1: never defer, case 2: defer only if RSSI of a packet is above a threshold, or case 3: Defer only if intended receiver of packet is above a certain value.

In some cases, such coordinated deferral can have certain resource requirements. For example, APs that coordinate across frequency can need to have multiple TX and TX circuitry and STAs can need to classified in different groups, wherein different groups will be assigned different BWs and hence different deferral rules.

Figure 5:
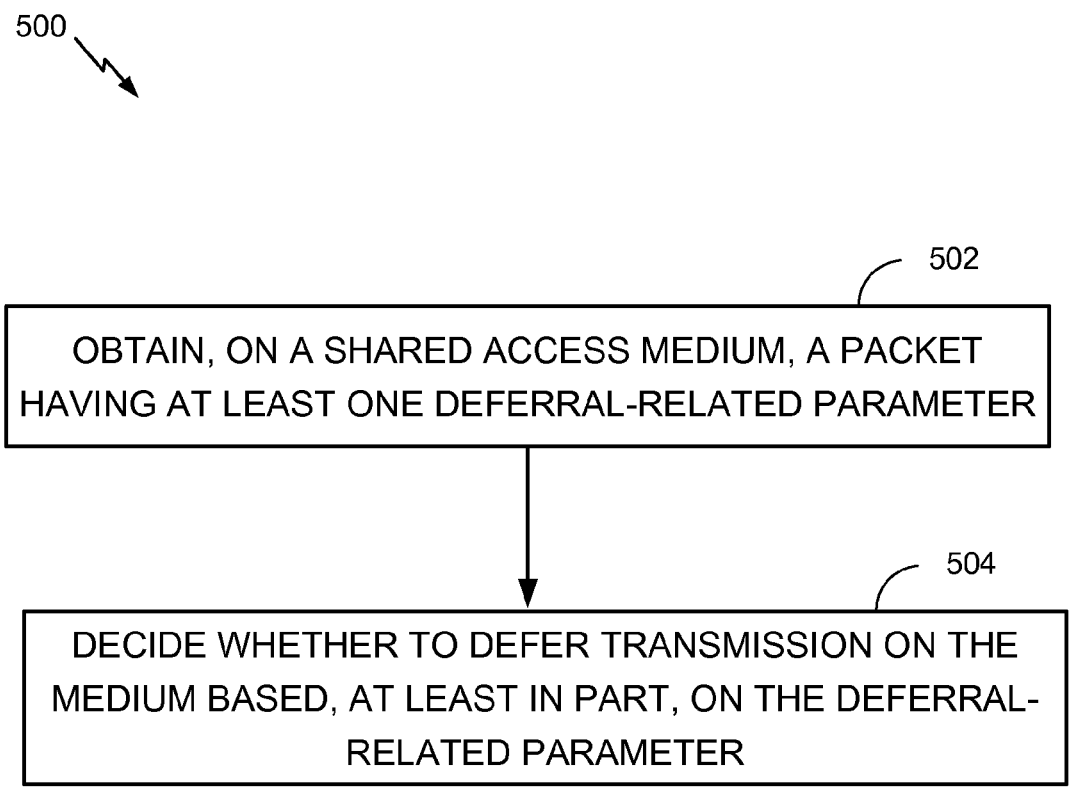
FIG. 5 illustrates example operations for wireless communications, in accordance with certain aspects of the present disclosure.

FIG. 5 illustrates example operations 500 for wireless communications by an apparatus, in accordance with certain aspects of the present disclosure. The operations 500 can begin, at 502, by obtaining, on a shared wireless access medium, a packet having at least one deferral-related parameter. At 504, the apparatus can decide whether to defer transmission on the medium based, at least in part, on the deferral-related parameter.

Figure 6:
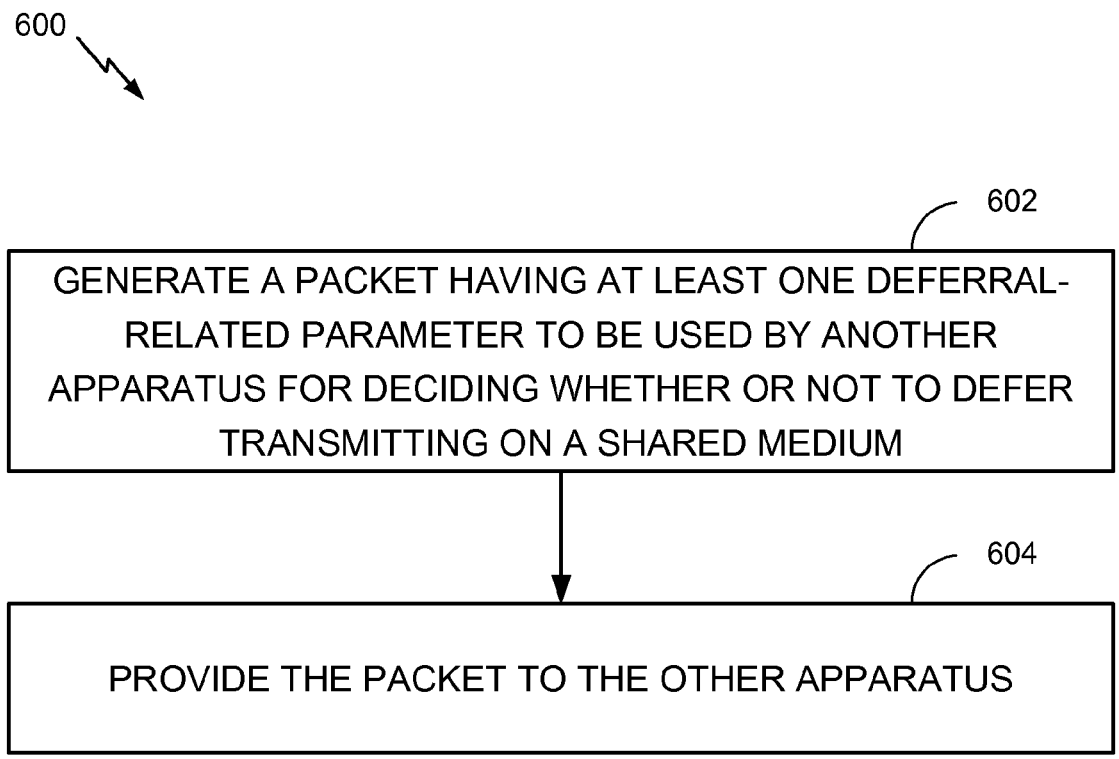
FIG. 6 illustrates example apparatus for wireless communications, in accordance with certain aspects of the present disclosure.

FIG. 6 illustrates example operations 600 for wireless communications by an apparatus, in accordance with certain aspects of the present disclosure. The operations 600 can begin, at 602, by generating a packet having at least one deferral-related parameter for a receiving device to use in deciding whether or not to defer transmitting on a shared wireless access medium. At 604, the apparatus can provide the packet to the other wireless communication device.

Figure 5A:
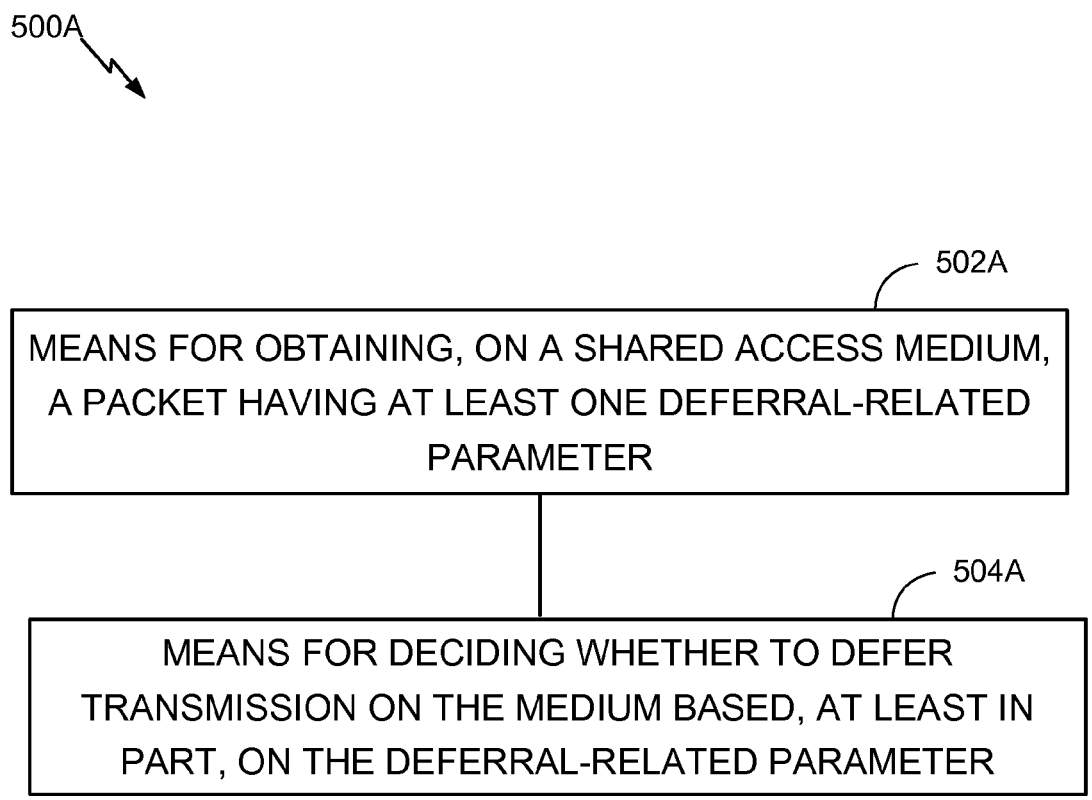
FIG. 5A illustrates example components capable of performing operations shown in FIG. 5.
Figure 6A:
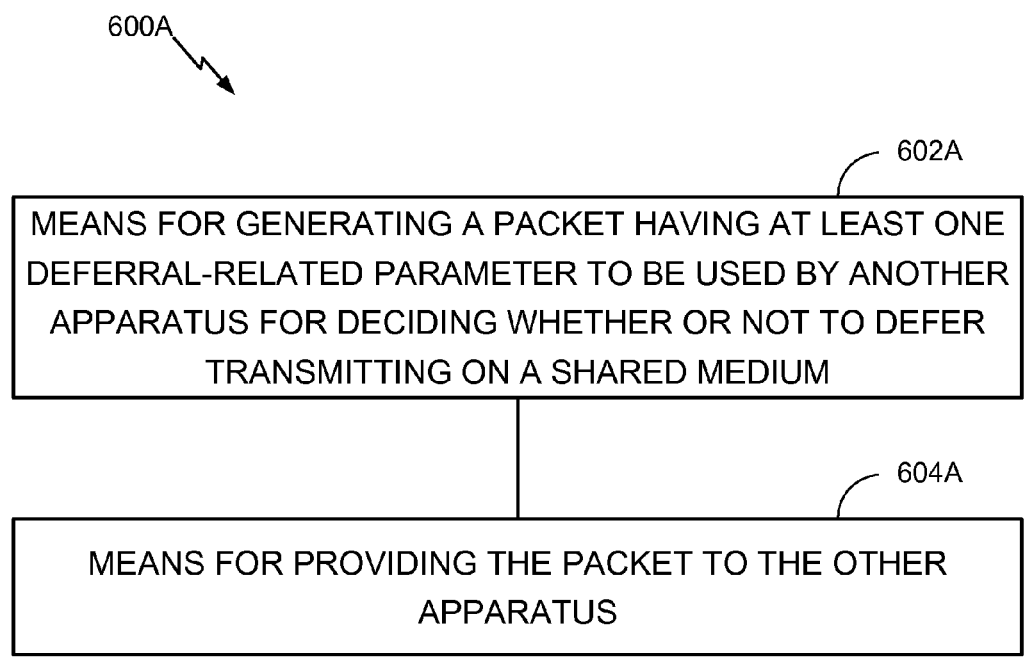
FIG. 6A illustrates example components capable of performing operations shown in FIG. 6.

The various operations of methods described above can be performed by any suitable means capable of performing the corresponding functions. The means can include various hardware and/or software component(s) and/or module(s), including, but not limited to a circuit, an application specific integrated circuit (ASIC), or processor. Generally, where there are operations illustrated in figures, those operations can have corresponding counterpart means-plus-function components with similar numbering. For example, operations 500 and 600 illustrated in FIGS. 5 and 6 correspond to means 500A and 600A illustrated in FIGS. 5A and 6A.

For example, means for transmitting can comprise a transmitter (e.g., the transmitter unit 410) and/or an antenna (s) 416 of the wireless device 402 illustrated in FIG. 4. Means for receiving can comprise a receiver (e.g., the receiver unit 412) and/or an antenna(s) 416 of the wireless device 402 illustrated in FIG. 4.

In some cases, a receiver or means for receiving may not include "front-end" RF functions, but could include means for receiving a packet, for example, from an RF front end processor. According to certain aspects, an apparatus operating in accordance with aspects described herein can obtain a packet (or parameters contained therein) from such an RF front end processor. Similarly, a transmitter or means for transmitting may not include "front-end" RF functions, but could include means for providing a packet, for example, to an RF front end processor for transmission. According to certain aspects, an apparatus operating in accordance with aspects described herein can generate a packet (or parameters to be included in a packet) and provide the packet to an RF front end processor for transmission.

Means for deciding and means for generating can include one or more processors, such as the processor 404 illustrated in FIG. 4. According to certain aspects, such means can be implemented by processing systems configured to perform the corresponding functions by implementing various algorithms (e.g., in hardware or by executing software instructions). For example, an algorithm for deciding whether to defer can take, as input, the deferral-related parameter included in a packet and make a decision whether or not to defer based on that input. An algorithm for generating a packet having such a deferral-related parameter can take, as input, information that mandate a certain type of deferral or lack of deferral, and generate a packet with a corresponding deferral-related parameter.

Deferral Based on Transmission Opportunity (TXOP)

In various embodiments, one or more of the deferral criteria discussed herein can be indicated in a control frame, such as an RTS or CTS frame. In various embodiments, transmitters can align (or partially align) the end times of medium-sharing transmissions during a transmission opportunity (TXOP). In various embodiments, deferral based on TXOP can implemented alone or in conjunction with one or more aspects described herein.

Figure 7:
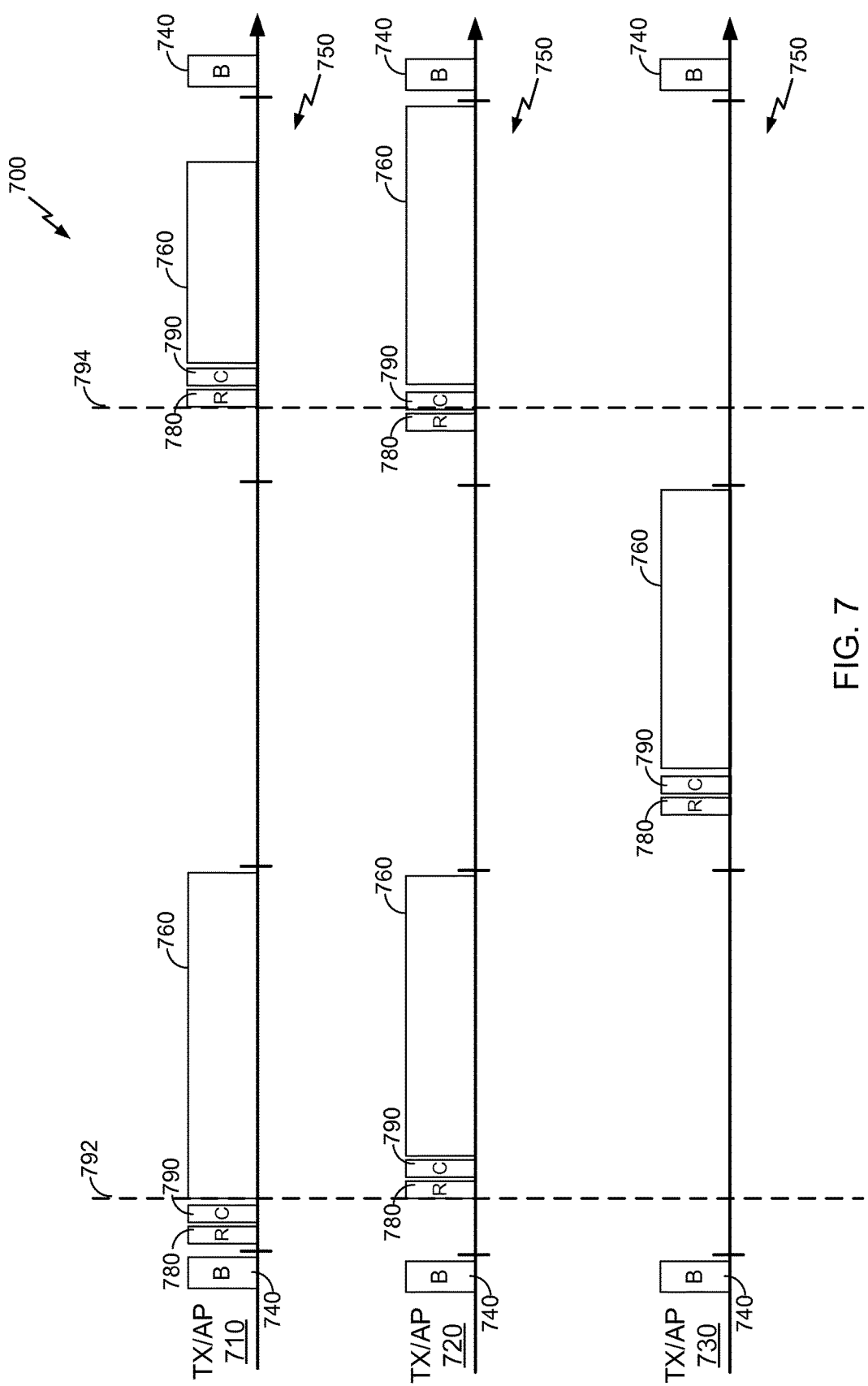
FIG. 7 shows a timing diagram 700 in which aspects of the present disclosure may be employed.

FIG. 7 shows a timing diagram 700 in which aspects of the present disclosure may be employed. In particular, FIG. 7 shows a timing diagram 700 that may be used in accordance with a TXOP based deferral mechanism. As illustrated in FIG. 7, three transmitters are present: transmitter 710, transmitter 720, and transmitter 730. Although three transmitters are shown, additional or fewer transmitters can be used. In various embodiments, each transmitter 710, 720, and/or 730 can use the same or overlapping channels.

In some embodiments, each transmitter 710, 720, and/or 730 can be associated with a separate AP such as, for example, the APs 254A-254C discussed above with respect to FIG. 3. In some embodiments, each transmitter 710, 720, and/or 730 can be associated with single AP such as, for example, different transmitters and/or sectors of the AP 104 (FIG. 1). In various embodiments the transmitters 710, 720, and/or 730 can be associated with the same wireless network. In some embodiments, one or more transmitters 710, 720, and/or 730 can be associated with a separate wireless network.

As shown in FIG. 7, one or more APs transmit beacons 740 on each transmitter 710, 720, and/or 730. For example, the AP 254A can transmit a beacon 740 on the transmitter 710, the AP 254B can transmit a beacon 740 on the transmitter 720, and the AP 254C can transmit a beacon 740 on the transmitter 730. In some embodiments, the beacons 740 can define a plurality of TXOPs 750. In other embodiments, the TXOPs 750 can be defined in other ways such as, for example, stored as a predetermined value in a memory. In various embodiments, the transmitters 710, 720, and/or 730 can at least partially synchronize the time slots 750, for example using the beacons 740, backhaul communications, and/or other wireless messages.

As shown in FIG. 7, when transmitters 710, 720, and/or 730 have data for a particular TXOP 750, they can perform a clear channel assessment (CCA). In the illustrated embodiment, the CCA can include an RTS 780 and/or a CTS 790. If the CCA determines that the channel is idle, or that medium-sharing is allowed, the transmitters 710, 720, and/or 730 can begin transmission. In various embodiments, the CCA can be performed in an initial portion of the TXOP 750, or in a portion just prior to the TXOP 750. In various embodiments, the CCA can be performed as discussed above with respect to FIGS. 5-6. For example, the transmitters 710, 720, and/or 730 can decide whether to defer transmission on a shared-medium based, at least in part, on a deferral-related parameter. If the CCA determines that the channel is not idle, and that medium-sharing is not allowed, the transmitters 710, 720, and/or 730 can refrain from transmitting, and in some embodiments can recheck the channel during the next TXOP 750.

Prior to transmission of data 760, the transmitters 710, 720, and/or 730 can transmit an RTS 780 and/or a CTS 790 (depending on whether data is to be provided or received). The RTS 780 and CTS 790 can include one or more deferral-related parameters. As discussed above, deferral-related parameters can include one or more indicators of: whether a packet BSS identifier (ID) is from an OBSS or from certain selected OBSSs (e.g., a list can provided by an AP), whether TX/RX identifiers match certain RX/TX identifier (e.g., which can be signaled by an AP), whether the TX power indicated in the packet is <X (e.g., with X indicated by the AP or packet, where X can be higher for OBSS packets than for non-OBSS packets), whether the RX power is <X (e.g., with X indicated by the AP or packet), whether the received packet is a DL and/or UL packet, whether the packet includes an indication that non-deferral is allowed (e.g., medium-sharing enabled/disabled on a per-BSS basis), whether the packet is of a specific type (e.g., control packets, data packets, etc.).

In some embodiments, the RTS 780 can include a planned MCS, or estimated maximum MCS, of the data 760. For example, the transmitter 710 can transmit the RTS 780 including an MCS of the data 760. The RTS 780 can further include an indication allowing or disallowing medium-sharing behavior. The transmitter 720 can receive the RTS 780 and can estimate an available link margin based on a RX power and the indicated MCS. Thus, the transmitter 720 can perform the CCA based on the estimated available link margin.

In some embodiments, the CTS 790 can include an RX CCA level threshold offset. For example, the transmitter 710 can transmit the CTS 790 in response to the RTS 780. The CTS 790 can include a field indicating an allowed offset to the CCA threshold level for the duration of the current (or following) TXOP. In various embodiments, the offset field can include between two and eight bits, and more particularly three bits. The transmitter 720 can receive the CTS 790 and can determine a CCA threshold based on a default RX CCA threshold and the indicated offset. Thus, the transmitter 720 can perform the CCA based on the CCA determined CCA threshold.

In various embodiments, devices 710, 720, and/or 730 receiving the RTS 780 but not the CTS 790 can be allowed to refrain from updating the NAV and can refrain from deferring to frames from the same sender for the duration of the TXOP 750. In various embodiments, such deferral behavior can be allowed/disallowed by an indication in the RTS 780. Devices 710, 720, and/or 730 receiving the CTS 790 can determine whether the CTS 790 power is below the determined CCA threshold (for example, determined based on the default RX CCA threshold plus the indicated offset from the CTS 790). If the CTS 790 power is below the determined CCA threshold, the devices 710, 720, and/or 730 can be allowed to disregard the CTS 790 NAV and can disregard deferral for packets of the same BSSID sent during the TXOP 750 duration indicated by the CTS.

In various embodiments, transmitters 710, 720, and/or 730 can be configured to align (at least partially or substantially) the end of their data transmissions 760. The end of the data transmissions 760 can align with the end of a TXOP 750 (plus or minus a set amount, for example accounting for acknowledgement). As used herein, partially aligned transmission can include transmissions that do not extend past the duration of a given TXOP 750. Thus, in some embodiments, while the data 760 transmitted by the transmitters 710 and 720 do not extend past the duration of each TXOP 750, the data transmissions 760 can complete an arbitrary amount of time prior to the end of the TXOP 750.

As discussed herein, the transmitters 710, 720, and/or 730 can determine a default RX CCA threshold level, in some embodiments. In various embodiments, a plurality of devices (such as, for example, transmitters 510, 520, and 530) can coordinate to assign the default RX CCA threshold level. In some embodiments, the transmitters 510, 520, and 530 can advertise the default RX CCA threshold level in the beacons 540. In some embodiments, the transmitters 510, 520, and 530 can use a standard RX CCA threshold level, or select from a plurality of standard RX CCA threshold levels, which can be for example retrieved from a memory or hard-coded. In some embodiments, the transmitters 510, 520, and 530 can independently determine the default RX CCA threshold level, for example dynamically based on observed behavior of other transmitters. A person having ordinary skill in the art will appreciate that the description herein related to the default RX CCA threshold level can apply to any other embodiments described herein.

In various embodiments, the default RX CCA threshold level can be defined relative to the transmitters' 710, 720, and/or 730 own TX power level. In various embodiments, transmitters' 710, 720, and/or 730 with a relatively lower TX power (for example, below a threshold) can be allowed to use a relatively higher RX CCA threshold level (for example, selected from a set of allowable RX CCA threshold levels). In various embodiments, transmitters' 710, 720, and/or 730 with a relatively higher TX power (for example, above a threshold) can be required or requested to use a relatively lower RX CCA threshold level (for example, selected from a set of allowable RX CCA threshold levels).

As shown in FIG. 7, "synchronous" medium reuse is shown at a time 792. In the synchronous embodiment, the TXOPs 750 are at least partially synchronized. At time 792, the transmitter 720 waits until after the CTS 790 before beginning its own CCA procedure (e.g., including RTS and/or CTS).

In another embodiment, "asynchronous" medium reuse is shown at a time 794. In the asynchronous embodiment, there may not be pre-specified or pre-scheduled TXOPs 750. Instead, each transmitter station can opportunistically look for TXOP reuse by monitoring transmissions on the medium. For example, at time 794, the transmitter 720 observes the RTS 780 transmitter by the transmitter 710 and initiates its own RTS 780 to see if it can reuse the TXOP.

In various embodiments, the RTS/CTS handshake described herein can be omitted. For example, RTS/CTS handshake can be omitted with confident measurements of the information carried by RTS/CTS (e.g., MCS, power, RX, CCA threshold, etc.). In particular, for a given transmission, a station can perform the CCA procedure by observing TX/RX identity information based on or from a preamble. Thus the station can determine if it can reuse the TXOP or not. Different deferral rules, as discussed herein, can be applied accordingly.

As used herein, the term "determining" encompasses a wide variety of actions. For example, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like. Further, a "channel width" as used herein can encompass or can also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above can be performed by any suitable means capable of performing the operations, such as various hardware and/or software component(s), circuits, and/or module(s). Generally, any operations illustrated in the Figures can be performed by corresponding functional means capable of performing the operations.

The various illustrative logical blocks, modules and circuits described in connection with the present disclosure can be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor can be a microprocessor, but in the alternative, the processor can be any commercially available processor, controller, microcontroller or state machine. A processor can also be implemented as a combination of computing devices, e.g., a combination of a DSP and a microprocessor, a plurality of microprocessors, one or more microprocessors in conjunction with a DSP core, or any other such configuration.

In one or more aspects, the functions described can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and Blu-ray® disc where disks usually reproduce data magnetically, while discs reproduce data optically with lasers. Thus, in some aspects, computer readable medium can comprise non-transitory computer readable medium (e.g., tangible media). In addition, in some aspects computer readable medium can comprise transitory computer readable medium (e.g., a signal). Combinations of the above should also be included within the scope of computer-readable media.

Thus, certain aspects can comprise a computer program product for performing the operations presented herein. For example, such a computer program product can comprise a computer readable medium having instructions stored (and/or encoded) thereon, the instructions being executable by one or more processors to perform the operations described herein. For certain aspects, the computer program product can include packaging material.

The methods disclosed herein comprise one or more steps or actions for achieving the described method. The method steps and/or actions can be interchanged with one another without departing from the scope of the claims. In other words, unless a specific order of steps or actions is specified, the order and/or use of specific steps and/or actions can be modified without departing from the scope of the claims.

Software or instructions can also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations can be made in the arrangement, operation and details of the methods and apparatus described above without departing from the scope of the claims.

While the foregoing is directed to aspects of the present disclosure, other and further aspects of the disclosure can be devised without departing from the basic scope thereof, and the scope thereof is determined by the claims that follow.

What is claimed is:

1. An apparatus configured to wirelessly communicate, comprising:
    a processing system comprising a processor and a memory component, operably coupled to the processor, the processing system configured to:
        receive a control frame from a separate wireless communication device, the control frame associated with a clear channel assessment (CCA) for a subsequent data transmission by the separate wireless communication device during a transmission opportunity (TXOP) on a shared wireless access medium,
        obtain at least one deferral related parameter from the control frame, the deferral related parameter indicative of allowing concurrent communications on the shared wireless access medium during the TXOP, and
        transmit data during the TXOP on the shared wireless access medium based, at least in part, on the at least one deferral-related parameter, wherein the data and the subsequent data transmission are transmitted concurrently.

2. The apparatus of claim 1, wherein the processing system is further configured to use one or more threshold values associated with the at least one deferral-related parameter in deferring the transmission.

3. The apparatus of claim 1, wherein the processing system is configured to defer the transmission further based on a list of overlapping basic service sets (OBSSs).

4. The apparatus of claim 1, wherein the control frame comprises a ready-to-send (RTS) frame and the at least one deferral-related parameter is received in the RTS frame.

5. The apparatus of claim 4, wherein the at least one deferral-related parameter comprises at least one of: a planned modulation and coding scheme (MCS) for a subsequent data transmission during the TXOP, an estimated MCS for the subsequent data transmission during the TXOP, and an indication allowing or disallowing non-deferral to the subsequent data transmission during the TXOP.

6. The apparatus of claim 5, wherein the processing system is configured not to defer transmissions during the TXOP for which the RTS frame has been received, and no clear-to-send (CTS) frame has been received.

7. The apparatus of claim 1, wherein the control frame comprises a clear-to-send (CTS) frame and the at least one deferral-related parameter is received in the CTS frame.

8. The apparatus of claim 7, wherein the at least one deferral-related parameter comprises at least one of an indication of an allowed CCA offset and a default CCA threshold applicable during the TXOP.

9. The apparatus of claim 8, wherein the processing system is configured to:
    determine whether the CTS has a power level below the default CCA threshold plus the offset; and
    not to defer transmissions during the TXOP.

10. The apparatus of claim 1, wherein the processing system is configured to define a plurality of TXOPs and the subsequent data transmission is transmitted during a first TXOP, and wherein the processing system is further configured to obtain at least one deferral related parameter indicative of disallowing concurrent communications, and defer the data transmission on the shared access medium until a second TXOP.

11. The apparatus of claim 1, wherein the processing system is configured to define a plurality of TXOPs, wherein the subsequent data transmission and data are transmitted during a first TXOP, and wherein the processing system is configured to align an end of the data transmission and the end of the subsequent data transmission with an end of the first TXOP.

12. The apparatus of claim 1, wherein the processing system is configured to align the transmission of the data with the transmission of the subsequent data transmission such that a duration of the data transmission does not extend past a duration of the subsequent data transmission.

13. An apparatus configured to wirelessly communicate, comprising:
    a processing system comprising a processor and a memory component, operably coupled to the processor, in a first wireless communication device, the processing system configured to:

generate a packet for wireless communication with a second wireless communication device, perform a clear channel assessment (CCA) associated with transmission of the packet during a transmission opportunity (TXOP) to the second wireless communication device on a shared wireless access medium, the CCA including a control frame comprising at least one deferral-related parameter indicative of allowing concurrent communications on the shared wireless access medium during the TXOP, wherein the third wireless communication device is configured to receive the control frame and obtain the deferral-related parameter to be used by the third wireless communication device for transmitting data concurrently with the packet on the shared wireless access medium, and transmit the packet to the second wireless communication device on the shared wireless access medium during the TXOP, wherein the third wireless communication device is configured to transmit the data concurrently with the transmission of the packet based on the deferral-related parameter.

14. The apparatus of claim 13, wherein the control frame comprises a ready-to-send (RTS) frame and the at least one deferral-related parameter in the RTS frame.

15. The apparatus of claim 14, wherein the at least one deferral-related parameter comprises at least one of: a planned modulation and coding scheme (MCS) for a subsequent data transmission during the TXOP, an estimated MCS for the subsequent data transmission during the TXOP, and an indication allowing or disallowing non-deferral to the subsequent data transmission during the TXOP.

16. The apparatus of claim 13, wherein the control frame comprises a clear-to-send (CTS) frame and the at least one deferral-related parameter in the CTS frame.

17. The apparatus of claim 16, wherein the at least one deferral-related parameter comprises at least one of an indication of an allowed CCA offset and a default CCA threshold applicable during the TXOP.

18. A method of wireless communications, comprising:
receiving a control frame from a separate wireless communication device, the control frame associated with a clear channel assessment (CCA) for a subsequent data transmission by the separate wireless communication device during a transmission opportunity (TXOP) on a shared wireless access medium;

obtaining at least one deferral-related parameter from the control frame, the deferral related parameter indicative of allowing concurrent communications on the shared wireless access medium during the TXOP; and transmitting data during the TXOP on the shared wireless access medium based, at least in part, on the at least one deferral-related parameter, wherein the data and the subsequent data transmission are transmitted concurrently.

19. The method of claim 18, further comprising using one or more threshold values associated with the at least one deferral-related parameter in deferring the transmission.

20. The method of claim 18, wherein deferring the transmission on the shared wireless access medium is further based on a list of overlapping basic service sets (OBSSs).

21. The method of claim 18, wherein the control frame comprises a ready-to-send (RTS) frame and the at least one deferral-related parameter is received in the RTS frame.

22. The method of claim 21, wherein the at least one deferral-related parameter comprises at least one of: a planned modulation and coding scheme (MCS) for a subsequent data transmission during the TXOP, an estimated MCS for the subsequent data transmission during the TXOP, and an indication allowing or disallowing non-deferral to the subsequent data transmission during the TXOP.

23. The method of claim 22, further comprising refraining from deferring to transmissions during the TXOP for which the RTS frame has been received, and no clear-to-send (CTS) frame has been received.

24. The method of claim 18, wherein the control frame comprises a clear-to-send (CTS) frame and the at least one deferral-related parameter is received in the CTS frame.

25. The method of claim 24, wherein the at least one deferral-related parameter comprises at least one of an indication of an allowed CCA offset and a default CCA threshold applicable during the TXOP.

26. The method of claim 25, further comprising:
determining whether the CTS has a power level below the default CCA threshold plus the offset; and
refraining from deferring to transmissions during the TXOP.

27. An apparatus for wireless communications, comprising:
means for receiving a control frame from a separate wireless communication device, the control frame associated with a clear channel assessment (CCA) for a subsequent data transmission by the separate wireless communication device during a transmission opportunity (TXOP) on a shared wireless access medium;
means for obtaining at least one deferral-related parameter from the control frame, the deferral related parameter indicative of allowing concurrent communications on the shared wireless access medium during the TXOP; and
means for transmitting data during the TXOP on the shared wireless access medium based, at least in part, on the at least one deferral-related parameter, wherein the data and the subsequent data transmission are transmitted concurrently.

28. The apparatus of claim 27, wherein the control frame comprises a ready-to-send (RTS) frame and the at least one deferral-related parameter is received in the RTS frame.

29. The apparatus of claim 27, wherein the control frame comprises a clear-to-send (CTS) frame and the at least one deferral-related parameter is received in the CTS frame.

30. A non-transitory computer-readable medium comprising code that, when executed, causes an apparatus to:
receiving a control frame from a separate wireless communication device, the control frame associated with a clear channel assessment (CCA) for a subsequent data transmission by the separate wireless communication device during a transmission opportunity (TXOP) on a shared wireless access medium;
obtain at least one deferral-related parameter from the control frame, the deferral related parameter indicative of allowing concurrent communications on the shared wireless access medium during the TXOP; and
transmitting data during the TXOP on the shared wireless access medium based, at least in part, on the at least one deferral-related parameter, wherein the data and the subsequent data transmission are transmitted concurrently.

31. The apparatus of claim 30, wherein the at least one deferral-related parameter is received in a ready-to-send (RTS) frame or a clear-to-send (CTS) frame of the control frame.

* * * * *